US012600816B2

(12) United States Patent
Bédard et al.

(10) Patent No.: US 12,600,816 B2
(45) Date of Patent: Apr. 14, 2026

(54) ALKYLENE OXIDE POLYMERIZATION USING ALUMINUM COMPOUNDS AND PHOSPHORUS-NITROGEN BASES

(71) Applicant: Dow Global Technologies LLC, Midland, MI (US)

(72) Inventors: Anne-Catherine Bédard, Midland, MI (US); Matthew E. Belowich, Midland, MI (US); Mari S. Rosen, Houston, TX (US); Sandra Varinia Bernales Candia, Midland, MI (US); David A. Babb, Lake Jackson, TX (US); Clark H. Cummins, Midland, MI (US); Richard J. Keaton, Pearland, TX (US); Matthew M. Yonkey, Sanford, MI (US); Peter J. Waller, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 798 days.

(21) Appl. No.: 17/790,225

(22) PCT Filed: Jan. 27, 2021

(86) PCT No.: PCT/US2021/015182

§ 371 (c)(1),
(2) Date: Jun. 30, 2022

(87) PCT Pub. No.: WO2021/154783

PCT Pub. Date: Aug. 5, 2021

(65) Prior Publication Data

US 2023/0092304 A1 Mar. 23, 2023

Related U.S. Application Data

(60) Provisional application No. 62/968,231, filed on Jan. 31, 2020.

(51) Int. Cl.
*C08G 65/26* (2006.01)

(52) U.S. Cl.
CPC ....... *C08G 65/269* (2013.01); *C08G 65/2654* (2013.01); *C08G 65/2675* (2013.01); *C08G 2650/24* (2013.01); *C08G 2650/58* (2013.01)

(58) Field of Classification Search
CPC .............. C08G 65/269; C08G 65/2654; C08G 65/2675; C08G 2650/24; C08G 2650/58
USPC .......................................................... 528/416
See application file for complete search history.

(56) References Cited

U.S. PATENT DOCUMENTS

| | | | | |
|---|---|---|---|---|
| 3,029,216 | A | | 4/1962 | Bailey |
| 3,313,743 | A | | 4/1967 | Filar |
| 3,321,533 | A | | 5/1967 | Patton |
| 3,707,513 | A | * | 12/1972 | Ueno ..................... C08G 65/12 502/155 |
| 3,755,197 | A | * | 8/1973 | Hsieh ..................... C08G 65/12 528/412 |
| 5,112,789 | A | | 5/1992 | McCain |
| 6,919,486 | B2 | | 7/2005 | Dexheimer |
| 7,226,988 | B1 | | 6/2007 | Dexheimer |
| 9,896,542 | B2 | | 2/2018 | Raghuraman |
| 2010/0144969 | A1 | * | 6/2010 | Coates ................... C08G 65/04 528/412 |
| 2011/0087001 | A1 | | 4/2011 | Coates |
| 2011/0130497 | A1 | * | 6/2011 | Su ....................... C07F 9/65815 252/609 |
| 2018/0237586 | A1 | | 8/2018 | Nakano |
| 2019/0315786 | A1 | * | 10/2019 | Li ....................... C07F 9/65817 |

FOREIGN PATENT DOCUMENTS

| | | | | |
|---|---|---|---|---|
| JP | 10273512 | A | * | 10/1998 |
| JP | 2017/141362 | A | | 8/2017 |
| JP | 2017/141432 | A | | 8/2017 |
| JP | 2017137430 | A | * | 8/2017 |
| WO | 2016/0245677 | A | | 2/2016 |

OTHER PUBLICATIONS

Inoue et al., WO 2016/024577 A1 machine translation in English, Feb. 18, 2016. (Year: 2016).*
Inoue et al., JP 2017-141362 A machine translation in English, Aug. 17, 2017. (Year: 2017).*
Yamamoto et al., JP 2017-137430 A machine translation in English, Aug. 10, 2017. (Year: 2017).*
Sanyo Chemical Industries, Ltd., “Sannix GP-1000”, 2024. (Year: 2024).*
Hayashi et al., JP 10-273512 A machine translation in English, Oct. 13, 1998. (Year: 1998).*
Polym. Chem. 2012, 3, 1189-1195.
Macromolecules 2008, 41, 7306-7315.
Macromolecules 2008, 41, 7058-7063.
Macromolecules 1974, 7, 153-160.
J. Polym. Sci. 1973, 11, 699-712.
J. Polym. Sci. 1959, 34, 157-160.

* cited by examiner

*Primary Examiner* — David T Karst
(74) *Attorney, Agent, or Firm* — Warner Norcross + Judd LLP

(57) ABSTRACT

Polyethers are prepared by polymerizing an alkylene oxide in the presence of a starter, an aluminum compound that has at least one hydrocarbyl substituent, and a phosphorus-nitrogen base. The phosphorus-nitrogen base is present in only a small molar ratio relative to the amount of starter. The presence of such small amounts of phosphorus-nitrogen base greatly increases the catalytic activity of the system, compared to the case in which the aluminum compound is used by itself. The product polyethers have low amounts of unsaturated polyether impurities and little or no unwanted high molecular weight fraction. Polymers of propylene oxide have very low proportions of primary hydroxyl groups.

9 Claims, No Drawings

ALKYLENE OXIDE POLYMERIZATION USING ALUMINUM COMPOUNDS AND PHOSPHORUS-NITROGEN BASES

This invention relates to a process for polymerizing one or more alkylene oxides or copolymerizing one or more alkylene oxides with one or more copolymerizable monomers which is not an alkylene oxide.

Alkylene oxide polymers and copolymers are produced globally in large quantities. Polyether polyols, for example, are an important raw material for producing polyurethanes. Among other things, they are used to make high resiliency, molded, or rigid foams. Polyether monols are used, for example, as surfactants and industrial solvents, among other uses. Carbonate- and ester-modified alkylene oxide polymers also find uses in these and other applications.

Polyether monols and polyols are produced by polymerizing an alkylene oxide in the presence of a starter compound. The starter compound has one or more functional groups at which the alkylene oxide can react to begin forming the polymer chains. The main functions of the starter compound are to provide molecular weight control and to establish the number of hydroxyl groups the polyether will have.

A catalyst is needed to obtain economical polymerization rates. The most commonly used catalysts are alkali metal hydroxides such as potassium hydroxide and the so-called double metal cyanide (DMC) catalyst complexes, of which zinc hexacyanocobaltate catalyst complexes are the most commercially important type.

Alkali metal hydroxides provide the benefits of low catalyst costs and acceptable polymerization rates. They are versatile in that they effectively polymerize many alkylene oxides. The product polyether usually, but not always, has a narrow molecular weight distribution. A particular advantage of these catalysts is that they can be used to polymerize ethylene oxide onto an alcohol starter. This ability is quite important industrially as many polyether polyols manufactured as polyurethane raw materials are block copolymers made by polymerizing propylene oxide and then ethylene oxide onto an starter compound. The alkali metal hydroxide catalyst permits this to be done easily and inexpensively, as both polymerizations can be performed in the same vessel using the same catalyst system, without recovering the intermediate poly(propylene oxide) polyol.

Nonetheless alkali metal hydroxides have well-known drawbacks. Alkali metal hydroxide catalysts promote a side reaction that forms unsaturated monoalcohols, which become alkoxylated to form unwanted monofunctional species. The presence of these unwanted monofunctional species can also broaden molecular weight distribution. Polyols made using these catalysts need to be neutralized and purified to remove catalyst residues, which adds significant capital and operating expense to the manufacturing process. In addition, the product polyether tends to have a broad molecular weight distribution when made in a back-mixed continuous process.

DMC catalysts provide rapid polymerization rates compared to alkali metal catalysts, even when used at very low catalyst concentrations. In addition, they have distinct and important advantages over alkali metal catalysts. The DMC catalysts rarely if at all promote the side reaction that produces monofunctional by-products, so the hydroxyl functionality of the product is close to the theoretical value (as defined by the starter). A second main advantage is that no neutralization step is needed. The catalyst residues often can be left in the product, unlike the case when alkali metal hydroxides are used as the polymerization catalyst. This can result in significantly lower production costs. A third advantage is that, unlike alkali metal hydroxide catalysts, DMC catalyst complexes produce low polydispersity polymers when the polymerization is performed in a back-mixed continuous main reactor.

Nonetheless, the DMC catalysts have disadvantages as well. They tend to perform poorly in the presence of high concentrations of hydroxyl groups, and especially in the presence of low molecular weight starter compounds like glycerin that have hydroxyl groups in the 1,2- or 1,3-positions with respect to each other. Under these conditions, the catalysts are difficult to activate, perform sluggishly and often become deactivated before the polymerization is completed. This represents a significant limitation on the widespread adoption of DMC catalysts. It is often necessary to produce the polyether in two or more discrete steps, in which the early stages of the polymerization are conducted in the presence of an alkali metal catalyst and, after cleaning up the resulting intermediate product, the remainder of the polymerization is performed using the DMC catalyst. This approach requires the intermediate to be neutralized and purified (because the DMC catalyst is deactivated by strong bases), thus re-introducing costs which the DMC-catalyzed polymerization is intended to avoid.

Another very significant disadvantage of the DMC catalysts is they cannot be used on an industrial scale to produce ethylene oxide-capped polyethers. Instead of adding onto the chain ends in a regular and controlled manner, the ethylene oxide instead tends to produce very high molecular weight poly(ethylene oxide) polymers. Despite many attempts to resolve this problem, it has not been satisfactorily addressed, and ethylene oxide-capped polyethers are almost always made at industrial scale using an alkali metal hydroxide catalyst to perform the capping step.

Yet another problem associated with DMC catalysts is they produce a small amount of very high molecular weight (40,000+ g/mol) polymers. The presence of these polymers increases polyol viscosity, broadens molecular weight distribution, and can also adversely affect the ability of the polyether polyols made with DMC catalyst complexes to produce flexible polyurethane foam.

Certain Lewis acids have been evaluated as alkylene oxide polymerization catalysts. The Lewis acids require essentially no activation time, but become deactivated rapidly and therefore cannot produce high molecular weight polymers or high conversions of alkylene oxide to polymer. In addition, poly(propylene oxide) polymers produced by Lewis acid catalysis tend to have a large proportion of primary hydroxyl groups.

In addition, various aluminum compounds have been described for use as alkylene oxide polymerization catalysts.

In *Polym. Chem.* 2012, 3, 1189-1195 there is described a propylene oxide polymerization in the presence of a poly(propylene oxide) starter compound, triisobutylaluminum and a phosphazene base. This polymerization is conducted in toluene solution at 20° C. The phosphazene base is used in large quantities, about one mole per equivalent of starter. US Published Patent Application No. 2018-0237586 describes another solution polymerization of propylene oxide in the presence of a trialkyl aluminum and a nitronium alkoxide, the latter of which is described as a starter. Again, large amounts of the nitronium alkoxide are used. High molecular weight polyethers that have a broad molecular weight distribution are obtained.

*Macromolecules* 2008, 41, 7058-7063 describes a polymerization of epichlorohydrin using a triisobutylaluminum compound and in the presence of tetraoctylammonium bromide, at temperatures up to room temperature, and in the absence of a starter.

U.S. Pat. No. 6,919,486 describes polymerizing propylene oxide in the presence of a polyether triol starter and an aluminum phosphonate catalyst. Ethylene oxide capping is also described. The polymerizations are performed in the absence of solvent and at a temperature of 110° C.

*Macromolecules* 1974, 7, 153-160 describes low temperature polymerizations of propylene oxide in bulk, in the presence of aluminoxanes such as $(C_2H_5)_2AlOAl(C_2H_5)_2$ (TEDA). No starter is mentioned. Polyethers having molecular weights of 100,000 to 1 million are obtained. *J. Polym. Sci.* 1973, 11, 699-712 describes using TEDA to polymerize propylene oxide in solution at 40° C., in the absence of a starter.

Diethylaluminum chloride is described as an alkylene oxide polymerization catalyst in a solution polymerization without a starter at temperatures up to 110° C. in U.S. Pat. No. 3,029,216 and in a bulk polymerization without a starter at 25° C. in *J. Polym. Sci.* 1959, 34, 157-160. High molecular weight polymers are obtained.

This invention is in one aspect a method for producing an alkylene oxide polymer or copolymer, comprising combining (i) at least one aluminum compound containing at least one trisubstituted aluminum atom, wherein at least one of the substituents of at least one trisubstituted aluminum atom is hydrocarbyl, (ii) at least one starter, (iii) at least one alkylene oxide, (iv) from 0.00005 to 0.1 mole, per equivalent of starter, of at least one phosphazene-nitrogen base and optionally (v) at least one comonomer that is not an oxirane, and polymerizing the alkylene oxide(s) or copolymerizing the alkylene oxide(s) and the comonomer to form the alkylene oxide polymer or copolymer.

The method of the invention offers several advantages, from both process and product perspectives.

Process advantages include rapid polymerization rates; the ability to alkoxylate starters that have a wide range of molecular weights, in particular low molecular weight starters that have hydroxyl equivalent weights of 30 to 75; the ability to use significantly lower levels of catalyst than needed with alkali metal hydroxides, thereby reducing costs and permitting at least in some cases the polyols to be used without the need to first remove catalyst residues; the ability to use higher URO (unreacted alkylene oxide) levels than can be used with the DMC catalyst without formation of unwanted higher molecular weight polymers; and the ability of the catalyst to polymerize ethylene oxide uniformly. This last advantage is of great importance industrially in view of the difficulty seen with polymerizing ethylene oxide with double metal cyanide catalysts. The ability to uniformly polymerize ethylene oxide permits the catalyst to be used to make oxyethylene-capped polyols that have high proportions of primary hydroxyl groups, and permits oxyethylene-capped polypropylene oxide), oxyethylene-capped poly (butylene oxide), oxyethylene-capped polypropylene oxide-co-ethylene oxide) and oxyethylene-capped poly(butylene oxide-co-ethylene oxide) polyols to be prepared using a single catalyst for the propylene oxide, butylene oxide, propylene oxide-co-ethylene oxide and/or butylene oxide-co-ethylene oxide polymerization as well as the capping (ethoxylation) step.

From the product standpoint, the advantages of the invention include i) low polydispersities ($M_w/M_n$); ii) absence of the "high molecular weight tail" that is seen in DMC catalyzed polymerizations; iii) low formation of unwanted monofunctional species due to the isomerization of alkylene oxide into unsaturated alcohols; and iv) when propylene oxide is homopolymerized, the production of polyethers that have very low proportions of primary hydroxyl groups.

The aluminum compound is an aluminum compound containing at least one trisubstituted aluminum atom. At least one, at least two or all three of the substituents of at least one trisubstituted aluminum atom are hydrocarbyl. Two or more of the substituents on a trisubstituted aluminum atom may together form a ring structure.

The aluminum compound may contain 1, 2, 3, 4 or more aluminum atoms (such as up to 100, up to 50, up to 25, up to 12 or up to 5 aluminum atoms), of which at least one is trisubstituted.

A hydrocarbyl substituent may be aliphatic, cycloaliphatic, aromatic or any combination of two or more thereof, and is bonded to the aluminum atom via an aluminum-carbon bond. The hydrocarbyl substituent in some cases has up to 12, up to 6 or up to 4 carbon atoms. The hydrocarbyl group may be, for example, a linear or branched alkyl group such as methyl, ethyl, n-propyl, isopropyl, n-butyl, isobutyl, t-butyl and the like. A hydrocarbyl substitutent(s) may be unsubstituted or inertly substituted.

Non-hydrocarbyl substituent groups bonded to the aluminum atom(s) may be, for example, halogen, phosphonate, hydride, oxo (i.e., —O—), alkoxide or phenoxide.

A halogen substituent may be, for example, fluorine, chlorine, bromine or iodine.

An alkoxide or phenoxide substituent may have the form $—O—R^2$ or $—O(—R^2—O)_z—R^2—O—Z$ wherein each $R^2$ is independently a hydrocarbyl or substituted hydrocarbyl group, z is zero or a positive number, Z is hydrocarbyl, inertly substituted hydrocarbyl, hydrogen or $—AlY_2$ where each Y is halogen, hydrocarbyl, phosphonate, hydrogen, oxo (i.e., —O—) or alkoxide or phenoxide. The alkoxide or phenoxide may include a polyether chain such as a poly (oxyethylene) or poly(oxypropylene chain). Specific examples of alkoxide or phenoxide substituents include ethoxide, n-propoxide, isopropoxide, t-butoxide, n-butoxide, isobutoxide, phenoxide, 2,6-di-t-butyl-4-methyl phenoxide, 2,6-diisopropylphenoxide, 2,6-diphenylphenoxide, 2,4,6-trimethylphenoxide, 4-fluorophenoxide, 4-chlorophenoxide, 3, 4, 5-trifluorophenoxide,

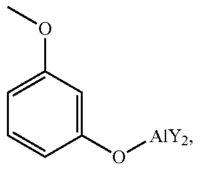

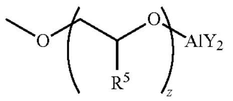

wherein $R^3$ is hydrogen, phenyl or $C_{1-4}$ alkyl and z is as before, and

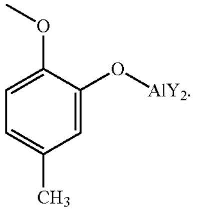

Any of these substituent groups except hydride may form all or part of a bridge between aluminum atoms. Thus, for example, an oxo (—O—) group may bond two aluminum atoms to from an aluminoxane. Similarly, a divalent hydrocarbon radical may be bonded to two aluminum atoms to form a bridge therebetween, as may an —O—$R^2$—O— diradical or a —O—($R^2$—O)$_z$—$R^2$—O— diradical.

In some embodiments, at least one aluminum atom is substituted with one or two hydrocarbyl groups, and is substituted with one or two halogen, oxo, ether, hydride or phosphonate groups. If more than one aluminum atom is present in the aluminum compound, all of the aluminum atoms may be substituted in such a manner.

Specific examples of aluminum compounds include trimethyl aluminum, triethyl aluminum, triisopropyl aluminum, tri-n-propyl aluminum, triisobutyl aluminum, tri-n-butyl aluminum, tri-t-butylaluminum, trioctadecylaluminum, dimethyl aluminum chloride, methyl aluminum dichloride, diethyl aluminum chloride, ethyl aluminum dichloride, diisobutyl aluminum chloride (DIBAL), isobutyl aluminum dichloride, methyl aluminum di[(2,6-di-t-butyl-4-methyl) phenoxide] ($Al(BHT)_2Me$), dimethyl 2,6-di-t-butyl-4-methylphenoxide ($AlBHTMe_2$)methyl aluminum di(2,6-diisopropyl)phenoxide, di methyl aluminum (2,6-diisopropyl) phenoxide methyl aluminum di[(2,6-diphenyl) phenoxide], dimethyl aluminum (2,6-diphenyl) phenoxide, methyl aluminum di[(2,4,6-trimethyl)phenoxide], dimethyl aluminum (2,4,6-trimethyl)phenoxide, tetraethylaluminane, tetramethylaluminane, diisobutyl aluminum hydride, isobutyl aluminum dihydride, dimethyl alumimum hydride, methyl aluminum dihydride, diethyl aluminum hydride, ethyl aluminum dihydride, diisopropyl aluminum hydride, isopropyl aluminum dihydride, diethyl aluminum ethoxide, ethyl aluminum diethoxide, dimethyl aluminum ethoxide, methyl aluminum diethoxide, dimethyl aluminum fluoride, methyl aluminum difluoride, diethyl aluminum fluoride, ethyl aluminum difluoride, diisobutyl aluminum fluoride, isobutyl aluminum difluoride, dimethyl aluminum bromide, methyl aluminum dibromide, diethyl aluminum bromide, ethyl aluminum dibromide, diisobutyl aluminum bromide, isobutyl aluminum dibromide, dimethyl aluminum iodide, methyl aluminum diiodide, diethyl aluminum iodide, ethyl aluminum diiodide, diisobutyl aluminum iodide, isobutyl aluminum iodide, bis(dimethylaluminum) methylphosphonate, bis(diethyl aluminum) methylphosphonate, bis(diethoxyaluminum) methylphosphonate, bis(di-n-propylaluminum) methyl phosphonate, bis(diisopropyl aluminum) methylphosphonate, bis(di-n-propoxylaluminum) methyl phosphonate, bis(diisopropoxylaluminum) methylphosphonate, bis(di-t-butylaluminum) methyl phosphonate, bis(di-t-butoxyaluminum) methyl phosphonate, bis(diphenylaluminum) methylphosphonate, bis(diphenoxyaluminum) methyl phosphonate, bis(diisobutylaluminum) methylphosphonate and a tetraalkylaluminoxane in which each alkyl group of the tetralkylaluminoxane independently contains 1 to 6 carbon atoms.

An "inert" substituent for purposes of this invention is one that is not reactive towards hydroxyl groups, amino groups or isocyanate groups. Examples of inert substituents include, for example, hydrocarbyl substituents, ether groups, ester groups tertiary amino groups, amide groups, halogen and the like.

For purposes of this invention, a "phosphorus-nitrogen base" is a compound having at least one —N—P—N— linkage and/or at least one —P—N—P— linkage, in which the bonds between the phosphorus and adjacent nitrogen atoms are independently single or double bonds. For example, an —N—P—N— linkage may take the form —N—P—N— (both nitrogen-phosphorus bonds being single bonds) or —N═P—N—, and a —P—N—P— linkage may take the form —P—N—P—, —P═N—P— or —P═$N^+$═P—. Alternating nitrogen and phosphorus atoms may form a ring structure that has, for example 3 to 10 phosphorus atoms and 3 to 10 nitrogen atoms.

The phosphorus-nitrogen base may contain, for example 1 to 8, 1 to 4 or 1 to 2 phosphorus atoms and 1 to 12 or 1 to 8 nitrogen atoms, provided that the total number of nitrogen atoms plus phosphorus atoms is at least 3. The phosphorus-nitrogen base may have a molecular weight (excluding any anionic counterion) of up to 1000, up to 750 or up to 650 g/mol. In some embodiments the molecular weight is up to 500 or up to 350 g/mol.

The phosphorus-nitrogen base may be neutral or may be cationic. When cationic, the charge may reside on a nitrogen or phosphorus atom, or may be delocalized. When the phosphorus-nitrogen base is cationic, it is generally employed in the form of a salt with an anionic counterion. The counter anion preferably does not alkoxylate under the conditions of the polymerization of the alkylene oxide(s), and in particular preferably is not alkoxide or aryloxide. Examples of useful counterions include halogen ions (such as fluoride, chloride, bromide and iodide), nitrate, hydrogen sulfate, carbonate, hexafluorophosphate, bis(trifluoromethylsulfonyl)imide, triflate and the like. The counterion is preferably monovalent.

The nitrogen atoms, to the extent they are bonded to substituents other than phosphorus, preferably are hydrocarbyl-substituted, and more preferably alkylated, i.e., all substituents on each of the nitrogen atoms that are not phosphorus preferably are hydrocarbyl-substituted and more preferably alkyl-substituted. Any hydrocarbyl group may be inertly substituted. The alkyl substituent groups may have, for example, 1 to 18 carbon atoms, with a preferred number being 1 to 8 carbon atoms or 1 to 4 carbon atoms. The substituents on the nitrogen atom(s) of the phosphorus-nitrogen base may all be the same, or two or more different substituents may be present. Furthermore, any two hydrocarbyl substituents on a single nitrogen atoms or on two different nitrogen atoms can form a ring structure that includes the nitrogen atom or atoms.

The phosphorus atoms, to the extent they are bonded to substituents other than nitrogen, may be bonded to an oxygen atom (such as to form a P═O linkage, for example, or to an oxygen atom of an aryloxy, alkoxy or phosphate substituent) or to a hydrocarbyl substituent. Any hydrocarbyl group may be inertly substituted. Hydrocarbyl substituents include phenyl; alkyl-substituted phenyl; alkyl, preferably having 1 to 18, 1 to 8 or 1 to 4 carbon atoms, and phenyl-substituted alkyl in which the alkyl group has 1 to 18, 1 to 8 or 1 to 4 carbon atoms.

Among the suitable phosphorus-nitrogen bases are those represented by the structure I:

(I)

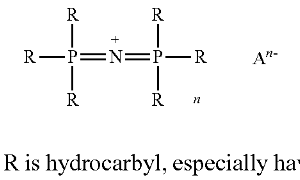

wherein each R is hydrocarbyl, especially having up to 18 or up to 8 carbon atoms, $NH_2$ or —N═P—$R_3$, A is an anion, and n is the valence of the anion A, the base having a molecular mass (excluding the mass of the counterion A) as described above. Any hydrocarbyl group may be inertly substituted. In some embodiments, each R is phenyl and the anion A is monovalent, especially halogen. A specific example of a phosphorus-nitrogen base of this type is a bis(triphenylphosphoranylidene)ammonium salt, particularly a salt of a monovalent anion A such as fluoride, chloride, bromide, iodide, acetate, triflate, $BF4^-$ or $PF6^-$.

Another class of suitable phosphorus-nitrogen bases includes those represented by the structure II:

(II)

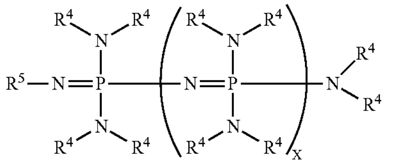

wherein $R^5$ and each $R^4$ are independently —$P[N(R^4)_2]_3$ or hydrocarbyl (more preferably alkyl or alkylene), provided that any two hydrocarbyl $R^4$ groups may form a divalent hydrocarbyl group that forms a ring that includes the nitrogen atom or atoms to which such $R^4$ groups are bonded. Alkyl or alkylene substituent groups may have, for example, 1 to 18 carbon atoms, with a preferred number being 1 to 8 carbon atoms or 1 to 4 carbon atoms. Any hydrocarbyl group may be inertly substituted. $R^5$ and each $R^4$ independently may be, for example, methyl, ethyl, n-propyl, isopropyl, n-butyl, t-butyl, isobutyl, n-octyl, isooctyl, 1,1,3,3,3-pentamethylpropyl and the like. In some embodiments, each $R^4$ is methyl and $R^5$ is $C_1$ to $C_8$ linear or branched alkyl. x is zero or a positive number and is selected with the $R^5$ and $R^4$ groups such that the base has a molecular mass as described before. x is preferably 0, 1, 2, or 3.

Specific examples of phosphorus-nitrogen bases having structure II include methylimino-tris(dimethylamino)phosphorane, ethylimino-tris(dimethylamino)phosphorane, t-butylimino-tris(dimethylamino)phosphorane (PAZ-P1), tert-octylimino-tris(dimethylamino)phosphorane), phosphazene base P2 (corresponding to structure II in which x is 1, each $R^4$ and $R^5$ are methyl), phosphazene base P2-Et (corresponding to structure II in which x is 1, each $R^4$ is methyl and $R^5$ is ethyl), phosphazene base P2-t-Bu (corresponding to structure II in which x is 1, each $R^4$ is methyl and $R^5$ is t-butyl), phosphazene base P2-tert-octyl (corresponding to structure II in which x is 1, each $R^4$ is methyl and $R^5$ is 1,1,3,3,3-pentamethylpropyl), ethylimino-tris(pyrrollidino) phosphorane, t-butylimino-tris(pyrrollidino)phosphorane, tert-octylimino-tris(pyrrollidino)phosphorane, 2-ethylimino-2-diethylamino-1,3-dimethylperhydro-1,3-2-diazaphosphorine, 2-t-butylimino-2-diethylamino-1,3-dimethylperhydro-1,3-2-diazaphosphorine, 2-tert-octylimino-2-diethylamino-1,3-dimethylperhydro-1,3-2-diazaphosphorine, phosphazene base P4 (1-methyl-4,4,4-tris(dimethylamino)-2,2-bis[tris(dimethylamino)-phosphoranylidenamino]-2$\lambda^5$,4$\lambda^5$-catenadi(phosphazene)), phosphazene base P4-Et (1-ethyl-4,4,4-tris(dimethylamino)-2,2-bis[tris(dimethylamino)-phosphoranylidenamino]-2$\lambda^5$, 4$\lambda^5$-catenadi(phosphazene)). and phosphazene base P4-t-bu (1-tert-Butyl-4,4,4-tris(dimethylamino)-2,2-bis[tris(dimethylamino)-phosphoranylidenamino]-2$\lambda^5$,4$\lambda^5$-catenadi(phosphazene)).

Still other useful phosphorus-nitrogen bases include phosphoramides represented by the structures III and/or IIIa:

(III)

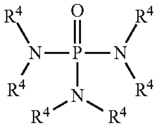

(IIIa)

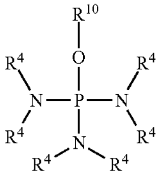

wherein each $R^4$ is as described with regard to structure I above, $R^{10}$ is a hydrocarbyl or inertly substituted hydrocarbyl group as described above, and wherein the molecular mass of the phosphoramide is as described above. Each $R^4$ may be, for example, methyl, ethyl, n-propyl, isopropyl, n-butyl, isobutyl, t-butyl, 1,1,3,3,3-pentamethylpropyl, and any two $R^4$ groups may together form a divalent hydrocarbyl radical that forms a ring structure that includes the nitrogen atom or atoms to which such $R^4$ groups are bonded. Specific examples of such phosphoramide compounds include hexamethylphosphoramide (tris(dimethylaminophosphine oxide), hexaethylphosphoramide, hexa-t-butylphosphoramide and tris (N,N-tetramethylene) phosphoramide.

Yet other suitable phosphorus-nitrogen bases are represented by the structure IV:

(IV)

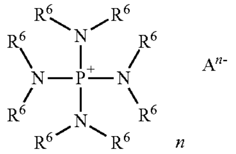

where A and n are as described with regard to structure II above and each $R^6$ is independently hydrocarbyl (more preferably alkyl), or N═P—$(NR^6{}_2)_3$ provided further that any two $R^6$ groups may form a divalent hydrocarbyl group that forms a ring that includes the nitrogen atom or atoms to which such $R^6$ groups are bonded. The molecular mass of phosphorus-nitrogen base having structure IV (not including the mass of the counterion A) is as before.

Examples of phosphorus-nitrogen bases having structure IV include phosphazene base P2-F (1,1,1,3,3,3-hexakis(dimethylamino)diphosphazenium fluoride), phosphazene base P2-Cl (1,1,1,3,3,3-hexakis(dimethylamino)diphosphazenium chloride), phosphazene base P2-Br (1,1,1,3,3,3-hexakis(dimethylamino)diphosphazenium bromide), phosphazene base P5-F (tetrakis[tris(dimethylamino) phosphoranylidenamino] phosphonium fluoride), phosphazene base P5-Cl (tetrakis[tris(dimethylamino)phosphoranylidenamino] phosphonium chloride) and phosphazene base P5-Br (tetrakis[tris(dimethylamino)phosphoranylidenamino] phosphonium bromide).

Another class of phosphorus-nitrogen bases includes phosphine compounds represented by structures V and/or VI:

(V)

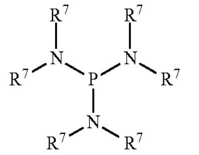

(VI)

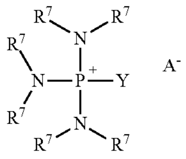

wherein each $R^7$ is independently hydrocarbyl and more preferably alkyl, provided that any two $R^7$ groups may form a divalent hydrocarbyl group that forms a ring that includes the nitrogen atom or atoms to which such $R^7$ groups are bonded. Y is halogen and A is a monovalent anion such as described above. Alkyl or alkylene substituent groups may have, for example, 1 to 18 carbon atoms, with a preferred number being 1 to 8 carbon atoms or 1 to 4 carbon atoms. Each $R^7$ independently may be, for example, methyl, ethyl, n-propyl, isopropyl, n-butyl, t-butyl, isobutyl, n-octyl, isooctyl, 1,1,3,3,3-pentamethylpropyl and the like. In some embodiments, each $R^4$ is methyl. Examples of phosphines having structure V include tris(dimethylamino)phosphine, tris(diethylamino)phosphine, tris(di-t-butylamino)phosphine and the like.

Still another class of suitable phosphorus-nitrogen bases include cyclic compounds represented by the structure VII:

(VII)

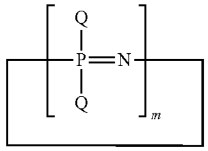

in which m is a number from 3 to 20, preferably from 3 to 10, more preferably from 3 to 5 and most preferably 3. Each Q is independently selected from hydrocarbyl, especially having up to 18 or up to 8 carbon atoms; —N═P—$R_3$ where is R is hydrocarbyl, preferably having up to 18 or up to 8 carbon atoms, aryloxy; alkoxy; and

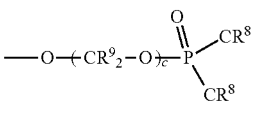

wherein c is zero or a positive number which is preferably up to 4, each $R^9$ is independently hydrocarbon, especially having 1 to 18, 1 to 8 or 1 to 4 carbon atoms, or hydrogen, and each $R^8$ is independently hydrocarbon, especially having 1 to 18, 1 to 8 or 1 to 4 carbon atoms. Each $R^9$ is preferably hydrogen or methyl and each $R^8$ is preferably alkyl having up to 4 carbon atoms, or phenyl. Phosphorus-nitrogen bases having structure VII include those described in US Published Patent Application No. 2011-0130497, incorporated herein by reference.

The polymerization is performed in the presence of one or more starter compounds. The starter compound has one or more functional groups capable of being alkoxylated. The starter may contain any larger number of such functional groups. The functional groups may be, for example, primary, secondary or tertiary hydroxyl, primary amino, secondary amino or thiol. A preferred starter contains 1 or more such functional groups, preferably 2 or more of such functional groups, and may contain as many as 12 or more of such functional groups.

In certain embodiments, the functional groups are all hydroxyl groups and the starter does not contain primary and/or secondary amino groups or thiol groups. In some embodiments, the starter compound will have 2 to 8, 2 to 4 or 2 to 3 hydroxyl groups.

In certain embodiments, the functional groups are all primary and/or secondary amine groups and the starter does not contain hydroxyl groups or thiol groups. In some embodiments, the starter compound will have 2 to 8, 2 to 4 or 2 to 3 primary and/or secondary amine groups.

The starter compound has an equivalent weight per functional group less than that of the polyether product. It may have an equivalent weight of 9 (in the case of water) to 6000 or more. In some embodiments, the starter compound has an equivalent weight of 9 to 4000, 9 to 2500, 30 to 1750, 30 to 1400, 30 to 1000, 30 to 500, or 30 to 250.

Equivalent weight of an alcohol or polyol is conveniently determined using titration methods such as ASTM 4274-16, which yield a hydroxyl number in mg KOH/gram of polyol that can be converted to equivalent weight using the relation equivalent weight=56,100÷hydroxyl number.

Among the suitable starters are vinyl alcohol, propenyl alcohol, allyl alcohol, acrylic acid, hydroxyethyl acrylate, hydroxyethyl methacrylate, a $C_{1-50}$ alkanol, phenol, cyclohexanol, an alkylphenol, water (considered for purposes of this invention as having two hydroxyl groups), ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, phenol, a polyphenolic starters such as bisphenol A or 1,1,1-tris(hydroxyphenyl)ethane and the like.

Other suitable starters are amine compounds such as morpholine, piperadine, piperazine, toluene diamine (any isomer or mixture of isomers), phenylene diamine (any isomer or mixture of isomers), diethyltoluene diamine, ethylene diamine, diethylene triamine, higher polyethylene polyamines having up to 8 nitrogen atoms, 1,3-propane diamine, 1,2-propane diamine, 1,4-butane diamine, cyclohexane diamine, isophorone diamine, bis(aminomethyl)cyclohexane and bis(3-aminopropyl) methyl amine.

Still other suitable starters are hydroxyl-terminated polyethers (including alkoxylates, especially ethoxylates and/or propoxylates, of hydroxyl-containing and/or amine starters including those just described) having hydroxyl equivalent weights less than that of the product of the polymerization. Such a polyether starter may have, for example, a hydroxyl equivalent weight of at least 125 and up to 6000, up to 4000, up to 2500, up to 1750, up to 1500, up to 1000, up to 500, or up to 250 g/equivalent. In some embodiments, the polyether starter may be a homopolymer of propylene oxide and/or a random or block copolymer of propylene oxide and one or more other alkylene oxides (especially ethylene oxide), which has a hydroxyl equivalent weight as mentioned in this paragraph and in which no more than 25%, no more than 15% or no more than 10% of the hydroxyl groups are primary.

In some embodiments, the aluminum compound is soluble in the starter at the proportions present at the start of the polymerization. Solubility is evaluated by combining the aluminum compound with the starter at the appropriate proportions and stirring at up to 160° C., preferably up to 75° C., for 15 minutes. The formation of a clear fluid upon visual inspection indicates that the aluminum compound is soluble in the starter.

Similarly, in some embodiments, the phosphorus-nitrogen base is soluble in the starter at the proportions present at the start of the polymerization, solubility being evaluated in the manner just described with regard to the aluminum compound. Preferably, both the aluminum compound and phosphorus-nitrogen base are soluble in the starter in the proportions present at the start of the polymerization.

In alternative embodiments, the aluminum compound and/or the phosphorus-nitrogen base are provided in the form of solutions in a suitable solvent.

The alkylene oxide(s) may be, for example, ethylene oxide, 1,2-propylene oxide, oxetane, 1,2-butene oxide, 2-methyl-1,2-butane oxide, 2,3-butane oxide, tetrahydrofuran, epichlorohydrin, hexene oxide, octene oxide, styrene oxide, divinylbenzene dioxide, a glycidyl ether such as bisphenol A diglycidyl ether, epichlorohydrin or other polymerizable oxirane. In some embodiments, the alkylene oxide is 1,2-propylene oxide, ethylene oxide, or a mixture of at least 50% (preferably at least 80%) by weight propylene oxide and correspondingly up to 50% (preferably up to 20%) by weight ethylene oxide. In some embodiments, two or more alkylene oxides are polymerized simultaneously (to form random copolymers), and or the composition of the alkylene oxide is changed one or more times, or even continuously, thoughout the course of the polymerization to form block and/or random/block copolymers.

In specific embodiments, the starter is a poly(propylene oxide) or random propylene oxide/ethylene oxide copolymer containing at least 50% or at least 70% by weight oxypropylene units and up to 50% or up to 30% ethylene oxide units, and the alkylene oxide is ethylene oxide. In such embodiments, the starter may have a hydroxyl equivalent weight of, for example, 500 to 3000, 500 to 2500 or 500 to 1750 g/equivalent. In such embodiments, the starter may be produced in the presence of an aluminum compound and phosphorus-nitrogen base in accordance with the invention and the ethoxylation of the starter may take place and/or without further addition of aluminum compound and phosphorus-nitrogen base, i.e., in the presence of the same aluminum compound and phosphorus-nitrogen base as was used to alkoxylate prior to the start of the final ethoxylation step, and without any step of neutralization, catalyst removal or catalyst deactivation after the starter is produced and before the ethoxylation step.

The polymerization is performed by combining the starter, aluminum compound and phosphorus-nitrogen base with the alkylene oxide(s) and optionally comonomer and then polymerizing the alkylene oxide(s). It is often convenient to combine at least a portion of the starter with at least part of the aluminum compound and at least part of the phosphorus-nitrogen base prior to contacting the aluminum compound and phosphorus-nitrogen base with the alkylene oxide. The polymerization proceeds at a wide range of temperatures from −100° C. to 250° C. or more. In some embodiments, the reaction temperature is at least 80° C., at least 100° C., at least 120° C. or at least 130° C. The polymerization temperature preferably does not exceed 190° C., and more preferably does not exceed 180° C. The polymerization reaction usually is performed at a superatmospheric pressure, but can be performed at atmospheric pressure or even a subatmospheric pressure.

Enough of the aluminum compound is used to provide a commercially reasonable polymerization rate, but it is generally desirable to use as little of the aluminum compound as possible consistent with reasonable polymerization rates, as this both reduces the cost for the catalyst and can eliminate the need to remove catalyst residues from the product. The amount of aluminum compound may be, for example, sufficient to provide 10 to 10,000 ppm of aluminum based on the weight of the alkylene oxide polymer or copolymer product of the polymerization. In specific embodiments, the amount of aluminum compound may be sufficient to provide at least 25 ppm, at least 50 ppm, at least 100 ppm or at least 250 ppm aluminum on the foregoing basis, and up to 5,000 ppm up to 2,500 ppm, up to 1500 ppm or up to 1000 ppm aluminum, again on the foregoing basis.

The amount of aluminum compound may be sufficient to provide, for example, at least 0.00005 moles of aluminum, at least 0.00075 moles of aluminum or at least 0.0001 moles of aluminum per equivalent of starter, and may be, for example, sufficient to provide up to 0.10 moles of aluminum, up to 0.075 moles of aluminum, up to 0.06 moles of aluminum, up to 0.05 moles of aluminum or up to 0.025 moles of aluminum per equivalent of starter.

The amount of phosphorus-nitrogen base may be, for example, at least 0.00005 mole, at least 0.0001 mole or at least 0.0002 mole per equivalent of starter, and may be, for example, up to 0.10 mole, up to 0.075 mole, up to 0.06 mole, up to 0.05 mole, up to 0.025 mole or up to 0.01 mole per equivalent of starter.

The mole ratio of aluminum compound to phosphorus-nitrogen base may be, for example, 1:10 to 20:1. A preferred ratio is at least 1:3, at least 1:2 or at least 2:3, and up to 6:1, up to 5:1, up to 4:1 up to 3:1, up to 2.5:1, up to 2:1, up to 3:2, up to 4:3 or up to 1:1. The optimum ratio may vary among specific aluminum compound/phosphorus-nitrogen base pairings.

The polymerization reaction can be performed batch-wise, semi-continuously (including with continuous addition of starter as described in U.S. Pat. No. 5,777,177) or continuously.

In a batch polymerization, the aluminum compound, phosphorus-nitrogen base, starter, alkylene oxide(s) and optional comonomer are combined to form a reaction mixture, and the reaction mixture is heated in a reaction vessel to the polymerization temperature until the desired molecular weight is obtained. A preferred manner of performing the batch polymerization is to dissolve the aluminum compound and phosphorus-nitrogen base into the starter, then combine the resulting solution with the alkylene oxide, followed by subjecting the resulting mixture to polymerization conditions until the desired molecular weight is obtained and/or the alkylene oxide is consumed. The aluminum compound, the phosphorus-nitrogen base, or both may be introduced in the form of a solution in an inert solvent such as a hydrocarbon like toluene or hexane.

In a semi-batch process, the aluminum compound, phosphorus-nitrogen base and starter are combined, preferably by dissolving the catalyst and phosphorus-nitrogen base into the starter. A polyether monol or polyether polyol corresponding to the product of the polymerization, and/or a polyether of intermediate molecular weight between that of the starter and product, may be combined with the starter if desired. The contents of the vessel are heated if necessary to the polymerization temperature and a portion of the alkylene oxide is introduced into the reaction vessel. When polymerization begins (typically as indicated by a drop of internal reactor pressure), more alkylene oxide is fed to the reactor under polymerization conditions. The alkylene oxide feed is continued until enough has been consumed to reach the target product molecular weight. Additional aluminum compound and/or phosphorus-nitrogen base may be added during the course of the alkylene oxide addition. In a semi-batch process, the entire amount of starter is commonly added at the start of the process. After the alkylene oxide feed is completed, the reaction mixture may be cooked down at the polymerization temperature to consume any remaining alkylene oxide.

A continuous polymerization includes the continuous or intermittent addition of at least alkylene oxide and starter, and continuous or intermittent removal of product during the polymerization. A continuous process is generally conducted by establishing steady-state concentrations (within the operational capabilities of the polymerization equipment) of the aluminum compound (or reaction products thereof), the phosphorus-nitrogen base, starter (or reaction products thereof), alkylene oxide and polymerizate under polymerization conditions in a continuous reactor such as a loop reactor, a plug flow reactor, or a continuous stirred tank reactor. The "polymerizate" is a mixture of polyethers that have molecular weights greater than that of the starter and up to that of the intended product. Additional aluminum compound, phosphorus-nitrogen base, starter and alkylene oxide are then continuously added to the reactor as the polymerization proceeds. These can be added as a single stream, as separate components, or in various sub-combinations, but the aluminum compound and phosphorus-nitrogen base are preferably added in the form of a solution in the starter. A product stream is continuously or intermittently withdrawn from the reactor during the polymerization. The rates of the additional stream(s) and product streams are selected to maintain steady-state conditions in the reactor (within the operational capabilities of the equipment), and to produce a product having a desired molecular weight.

The product stream withdrawn from the continuous reactor may be cooked down for some period of time to allow the unreacted alkylene oxide in that stream to be consumed to low levels.

A continuous process is particularly suitable for producing a polyether product having a hydroxyl equivalent weight from 150 to 5000, especially from 350 to 2500 and still more preferably from 500 to 2000 g/equivalent.

In a semi-batch or continuous process as described above, the alkylene oxide(s) may be fed to the reactor on demand by continuously pressurizing the reactor with the alkylene oxide(s) to a predetermined internal reactor pressure and/or alkylene oxide partial pressure.

The polymerization reaction can be performed in any type of vessel that is suitable for the pressures and temperatures encountered. In a continuous or semi-continuous process, the vessel should have one or more inlets through which the alkylene oxide and additional starter compound can be introduced during the reaction. In a continuous process, the reactor vessel should contain at least one outlet through which a portion of the partially polymerized reaction mixture can be withdrawn. A tubular reactor that has multiple points for injecting the starting materials, a loop reactor, and a continuous stirred tank reactor (CTSR) are all suitable types of vessels for continuous or semi-continuous operations. The reactor should be equipped with a means of providing and/or removing heat, so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that prevents significant back-mixing from occurring. Plug flow operation in a pipe or tubular reactor is a preferred manner of performing such a cook-down step.

The crude product obtained in any of the foregoing processes may contain up to 0.5% by weight, based on the total weight, of unreacted alkylene oxide; small quantities of the starter compound and low molecular weight alkoxylates thereof; and small quantities of other organic impurities and water. Volatile impurities (including unreacted alkylene oxides) should be flashed or stripped from the product. The crude product typically contains catalyst residues and residues of the aluminum compound and/or phosphorus-nitrogen base. It is typical to leave these residues in the product, but these can be removed if desired. Moisture and volatiles can be removed by stripping the polyol.

The process of the invention is useful for preparing polyether polyol products that can have hydroxyl equivalent weights from as low as about 85 to as high as 6,000 or more.

The polymerization reaction can be characterized by the "build ratio", which is defined as the ratio of the number average molecular weight of the polyether product to that of the starter compound. This build ratio may be as high as 160, but is more commonly in the range of 2.5 to about 65 and still more commonly in the range of 2.5 to about 50. The build ratio is typically in the range of about 2.5 to about 15, or about 7 to about 11 when the polyether product has a hydroxyl equivalent weight of 85 to 400 g/equivalent.

In some embodiments the alkylene oxide is polymerized with or in the presence of one or more copolymerizable monomers that are not oxiranes. Examples of such copolymerizable monomers include carbonate precursors that copolymerize with an alkylene oxide to produce carbonate linkages in the product. Examples of such carbonate precursors include carbon dioxide, phosgene, linear carbonates and cyclic carbonates. Other copolymerizable monomers include carboxylic acid anhydrides, which copolymerize with alkylene oxides to produce ester linkages in the product.

In some embodiments, polyether polyols made in accordance with the invention are homopolymers of propylene oxide or random copolymers containing at least 50%, at least 70% or at least 90% by weight oxypropylene units formed by polymerizing propylene oxide and correspondingly up to 50%, up to 30% or up to 10% by weight oxyethylene units formed by polymerizing a mixture of propylene oxide and ethylene oxide (in each case without the presence of a non-alkylene oxide copolymerizable monomer), having any one or more of the following characteristics:

a) hydroxyl equivalent weight of at least 500, at least 750, at least 1000 or at least 1200, and up to 4000, up to 3000, up to 2500, up to 2200 or up to 2000 g/equivalent;
b) nominal hydroxyl functionality of 2 to 8;
c) no more than 0.015, no more than 0.01, no more than 0.007 meq/g of terminal unsaturation;
d) a polydispersity ($M_w/M_n$) by gel permeation chromatography of no more than 1.15, no more than 1.10, no more than 1.07 or no more than 1.05;
e) no more than 2000 parts by million by weight (ppm), no more than 1200 ppm, no more than 1000 ppm, no more than 750 ppm, no more than 500 ppm, no more than 250 ppm, no more than 100 ppm or no more than 50 ppm, based on polyether polyol weight, of a fraction having a molecular weight by GPC of 40,000 g/mol or more; and f) no more than 12%, no more than 10%, no more than 8%, no more than 6% or no more than 5% of the hydroxyl groups are primary hydroxyl groups as determined by ASTM D-4273 or equivalent method. The polyether product may have all of features a)-f).

In specific embodiments, the polyether polyol is a propylene oxide homopolymer or a random copolymer of a mixture of at least 85% by weight propylene oxide and correspondingly up to 15% by weight ethylene oxide, based on the combined weight of all alkylene oxides, the polyether polyol in each case being prepared by polymerizing the propylene oxide or mixture of propylene oxide and ethylene oxide without the presence of a copolymerizable monomer that is not an oxirane; and the polyether polyol a) has a hydroxyl equivalent weight of 1000 to 2500 g/equivalent, b) has a nominal functionality of 2 to 8; c) has no more than 0.007 meq/g of terminal unsaturation; d) has a polydispersity ($M_w/M_n$) of no more than 1.07 and preferably no more than 1.05; and e) contains no more than 1200 ppm, no more than 1000 ppm, no more than 250 ppm or no more than 50 ppm of a fraction having a molecular weight by GPC of 40,000 g/mol or more. Such a polyether polyol may in addition have no more than 12%, no more than 10%, no more than 8%, no more than 6% or no more than 5% primary hydroxyl groups.

Polyether polyols produced in accordance with the invention are useful for making polyurethanes, among other things. Higher equivalent weight (500-6000 g/equivalent) polyether polyol products are useful in making elastomeric or semi-elastomeric polyurethane, including noncellular or microcellular elastomers, and flexible polyurethane foams. The flexible polyurethane foams may be made in a slabstock or molding process. Polyether polyol products having equivalent weights of about 225 to 400 are useful in making semi-flexible foams as well as the so-called viscoelastic or "memory" foams. Polyether polyols having equivalent weights of 85 to 400 are useful in making rigid polyurethane foams, such as thermal insulating foams for appliances, buildings, ship hulls and the like, as well as in various coating, adhesive, sealant and elastomer products. The polyether polyols tend to have properties quite similar to those made in conventional DMC-catalyzed polymerization process and in alkali metal hydroxide-catalyzed polymerization processes.

Polyether monols produced in accordance with the invention are useful as surfactants or as industrial solvents, among other uses.

The following examples are provided to illustrate the invention but are not intended to limit the scope thereof. All parts and percentages are by weight unless otherwise indicated.

Catalyst Preparation Procedure

The starter is heated at 70° C. and purged with nitrogen and/or passed through a plug of alumina before use. 20 g of starter is transferred to a 50-mL glass jar. Under nitrogen, the indicated amounts of aluminum compound and phosphorus-nitrogen base (if any) are combined with the starter. The jar is capped and its contents stirred for approximately 20 minutes. If the resulting mixture appears heterogeneous, the contents of the jar are heated at 70° C. for 5-10 additional minutes with continued stirring, and then cooled.

Parallel Pressure Reactor (PPR) Polymerization Procedure

Alkylene oxide polymerizations and/or propylene oxide oxide/carbon dioxide copolymerizations are performed on using a 48-well Symyx Technologies Parallel Pressure Reactor (PPR). Each of the 48 wells is equipped with an individually weighed glass insert having an internal working liquid volume of approximately 5 mL. The wells each contain an overhead paddle stirrer.

0.7 mL of the starter/catalyst/phosphorus-nitrogen base mixture (approximately 0.72 g of the starteris charged to each insert. Each well is pressurized with 50 psig (344.7 kPa) of nitrogen and then heated to the polymerization temperature. Upon reaching the polymerization temperature 1 mL of the epoxide is injected into each well, where it reacts with the starter in the glass insert.

The internal pressure in the headspace of each well is monitored individually throughout the polymerization. Each hour after the first injection of epoxide, the internal pressure is observed, and if the pressure in any particular well has fallen below 190 psig (1.31 MPa), another 1 mL of the alkylene oxide is injected. This is repeated up to three times throughout the entire length of the run, which is 4 hours. 4 hours after the first epoxide injection, the wells are allowed to cool to room temperature and vented. The glass inserts are allowed to stand under nitrogen at 40-50° C. overnight to allow residual epoxide to volatilize, after which the inserts are weighed to determine the amount of product.

The resulting products are analyzed for molecular weight and polydispersity ($M_w/M_n$) by gel permeation chromatography against a polystyrene standard. Primary hydroxyl content is determined by functionalizing the product with trifluoroacetic anhydride and evaluating the resulting product by $^{19}F$ NMR spectroscopy, per a standard method such as ASTM D-4273.

EXAMPLES 1-7 AND COMPARATIVE SAMPLE A

Propoxylations of a 700 molecular weight, trifunctional poly(propylene oxide) starter are performed in a semi-batch reactor using various aluminum compounds and bis(triphenylphosphoranylidene(ammonium) chloride salt (PPNCl) as the phosphorus-nitrogen base. Polymerization temperature is 160° C.

The aluminum compounds are triethyl aluminum ($AlEt_3$), diethyl aluminum chloricde ($Et_2AlCl$), diisobutyl aluminum hydride (DIBAL) and tetraethyldialuminoxane (TEDA), as indicated in Table 1.

The aluminum compound:PPNCl molar ratio in each of Examples 1, 2 and 5-7 is 1:0.5; this ratio is 1:1 for Examples 3 and 4. The mole ratios of PPNCl to aluminum provided by the aluminum compound are as indicated in Table 1. The PPNCl is omitted in Comp. Sample A.

The amount of 1,2-propylene oxide (PO) fed, the run time and yield are indicated in Table 1, together with the % primary hydroxyl groups, polydispersity and $M_n$ of the product.

TABLE 1

Semi-Batch Polymerizations using Aluminum Catalysts and PPNCl

| Sample | Catalyst | ppm Catalyst | Mole ratio, P—N base to Al | PO partial pressure (psi/kPa) | PO fed (mL) | Run Time (hr) | Yield (g) | %1 OH | PDI | $M_n$ |
|---|---|---|---|---|---|---|---|---|---|---|
| 1 | $AlEt_3$ | 1900 | 0.5:1 | 30/207 | 164.1 | 1.0 | 160.2 | ND | 1.02 | 3972 |
| 2 | $AlEt_3$ | 955.6 | 0.5:1 | 30/207 | 163.9 | 2.5 | 163.9 | ND | ND | ND |
| 3 | $Et_2AlCl$ | 2000 | 1:1 | 20/138 | 163.8 | 19.5 | 159.7 | ND | 1.11 | 3175 |
| 4 | DIBAL | 2000 | 1:1 | 20/138 | 164 | 28.3 | 173.1 | ND | 103 | 3630 |
| 5 | TEDA | 3110 | 0.5:1 | 20/138 | 164.4 | 1.3 | 164.4 | 4.6 | 1.02 | 3900 |
| 6 | TEDA | 1555 | 0.5:1 | 30/207 | 164.5 | 1.2 | 163.0 | 4.5 | 1.02 | 3848 |
| 7 | TEDA | 778 | 0.5:1 | 40/276 | 147.5 | 2.2 | 140.2 | 2.6 | 1.03 | 3327 |
| A* | TEDA | 1555 | N/A | 30/207 | 34.1 | 19.6 | 56.2 | ND | 1.04 | 1356 |

*Comparative.
ND is not determined

Comparative Sample A is a control in which TEDA is the aluminum catalyst by itself; no phosphorus-nitrogen base is present. The polymerization proceeds sluggishly. Little PO is consumed after almost 20 hours and yield to product is correspondingly low, as is product molecular weight.

In each of Examples 1-7, an aluminum compound is paired with PPNCl. In each case, about 5 times as much PO is consumed, compared to Comparative Sample A, and yields and product molecular weights are higher as a result. The runs made using triethyl aluminum and TEDA are especially remarkable as the run times are an order of magnitude shorter than with the control. These combinations of aluminum compound and PPNCl are especially active polymerization catalysts.

In all cases, polydispersity is low and % primary hydroxyl is also very low in those cases in which it is measured.

EXAMPLES 8-26 AND COMPARATIVE SAMPLE B

Propylene oxide polymerizations are performed using the PPR procedure described above. The starter is the 700 molecular weight triol described in the previous examples. The aluminum compound and the amount of aluminum compound (in parts per million, ppm) by weight based on the amount of starter) in each case is as indicated in Table 2. The phosphorus-nitrogen base is PPNCl in all cases. The initial molar ratios of aluminum compound to phosphorus-nitrogen base are as indicated in Table 2. The polymerization temperature is 160° C. The amount of product produced, the % of hydroxyl groups that are primary, the number average molecular weight and the polydispersity (PDI, $M_w/M_n$) are as reported in Table 2.

TABLE 2

PO Polymerizations with Various Al Compound and PPNCl

| Sample | Aluminum Compound | ppm Al Compound | Mole ratio, Al compound:PPNCl | Yield, g | % 1° OH | PDI | $M_n$ |
|---|---|---|---|---|---|---|---|
| Ex. 8 | $EtAlCl_2$[1] | 2100 | 1:2 | 0.86 | ND | ND | ND |
| Ex. 9 | $EtAlCl_2$ | 2100 | 1:1 | 1.01 | 6 | 1.03 | 1263 |
| Ex. 10 | $EtAlCl_2$ | 2100 | 2:1 | 3.15 | 5 | 1.06 | 3856 |
| Ex. 11 | $EtAlCl_2$ | 2100 | 4:1 | 3.11 | 4 | 1.06 | 3791 |
| Ex. 12 | DIBAL[2] | 2350 | 1:2 | 0.86 | ND | ND | ND |
| Ex. 13 | DIBAL | 2350 | 1:1 | 3.14 | 4 | 1.03 | 4032 |
| Ex. 14 | DIBAL | 2350 | 2:1 | 3.19 | 5 | 1.06 | 4118 |
| Ex. 15 | DIBAL | 2350 | 4:1 | 3.12 | 5 | 1.06 | 3983 |
| Ex. 16 | $AlEt_3$[3] | 2000 | 1:2 | 0.81 | ND | 1.03 | 1015 |
| Ex. 17 | $AlEt_3$ | 2000 | 1:1 | 1.24 | 5 | 1.03 | 1380 |
| Ex. 18 | $AlEt_3$ | 2000 | 2:1 | 2.20 | 5 | 1.03 | 2584 |
| Ex. 19 | $AlEt_3$ | 2000 | 4:1 | 0.78 | 4 | 1.03 | 974 |
| Ex. 20 | TEDA[4] | 1550 | 1:8 | 0.88 | 4 | 1.03 | 1074 |
| Ex. 21 | TEDA | 1500 | 1:4 | 0.88 | 4 | 1.03 | 1069 |
| Ex. 22 | TEDA | 1500 | 1:2 | 0.90 | 4 | 1.03 | 1086 |
| Ex. 23 | TEDA | 1500 | 1:1 | 2.82 | 5 | 1.02 | 3505 |
| Ex. 24 | TEDA | 1500 | 2:1 | 3.26 | 5 | 1.02 | 4281 |
| Comp. B* | TDIPAP[5] | 2950 | N/A | 1.02 | 23 | 1.05 | 1254 |
| Ex. 25 | TDIPAP | 2950 | 1:3 | 0.81 | ND | 1.03 | 1010 |
| Ex. 26 | TDIPAP | 2950 | 1:1 | 2.77 | ND | 1.02 | 3352 |

*Comparative.
ND = not done.
[1]Ethyl aluminum dichloride.
[2]Diisobutyl aluminum chloride.
[3]Triethyl aluminum.
[4]Tetramethyl aluminane.
[5]Tris(diisopropoxylaluminum) phosphate.

As the data for Examples 8, 12, 16, 20-22 and 25 show, a 2:1 or greater excess of PPNCl results in little polymerization under these conditions. When used in such an excess, PPNCl may actually repress polymerization, as suggested by comparing Comp. Sample B with Ex. 25. Much greater yields and much higher molecular weights are obtained when the molar ratio of Al compound to PPNCl is 1:1 to 2:1. The results for Examples 20-24 suggest that, for the TEDA/PPNCl combination at least, the molar ratio should be maintained below 4:1.

EXAMPLES 27-31

EO polymerizations are performed using the PPR procedure described above. The starter is the 700 molecular weight triol described in the previous examples. The aluminum catalyst is as indicated in Table 3 below. The amount of aluminum compound in each case is as indicated in Table 3; amounts are ppm by weight based on starter. The phosphorus-nitrogen base is PPNCl. The aluminum compound and phosphorus-nitrogen base are initially present at a 1:1 molar ratio in Examples 27-29; it is 1:0.5 in Example 30 and 1:0.25 in Example 31. The polymerization temperature is 160° C. The amount of product produced, the % of hydroxyl groups that are primary, the number average molecular weight and the polydispersity (PDI, $M_w/M_n$) are as reported in Table 3.

TABLE 3

EO Polymerizations with PPNCl

| Sample | ppm Al compound | Aluminum Compound | Yield, g | % 1° OH | PDI | $M_n$ |
|---|---|---|---|---|---|---|
| Ex. 27 | 2000 | $Et_2AlCl$ | 1.96 | 86 | 1.08 | 2379 |
| Ex. 28 | 2000 | $EtAlCl_2$ | 2.78 | ND | 1.06 | 3895 |
| Ex. 29 | 1550 | TEDA | 2.91 | ND | 1.04 | 3680 |
| Ex. 30 | 1550 | TEDA* | 2.50 | ND | 1.05 | 3189 |
| Ex. 31 | 1550 | TEDA** | 2.54 | ND | 1.05 | 3162 |

*TEDA/PPNCl mole ratio 1:0.5, 0.25 moles of PPNCl per mole of Al atoms.
**TEDA/PPNCL mole ratio is mole ratio 1:0.25, 0.125 moles of PPNCl per mole of Al atoms.
ND is not determined.

Rapid polymerizations yielding high molecular weight, low polydispersity polymer are obtained in each case.

EXAMPLES 32-36

Various combinations of various aluminum compounds and PPNCl are evaluated in propoxylations of small molecule starters. The mole ratio of PPNCl to aluminum provided by the aluminum compound is 1:1 in all cases. The starters are ortho-toluene diamine (oTDA), bis(3-aminopropyl) methyl amine (BAPMA), glycerin and sorbitol, as indicated in Table 4. Polymerizations are performed using the PPR procedure in the same general manner as in the previous examples. The aluminum compound is as indicated in Table 4, as are the results of the polymerizations.

TABLE 4

PO Polymerizations from Small Molecules Using PPNCl

| Sample | Al compund | ppm Al compound | Starter | Starter molecular weight | Yield, g | PDI | $M_n$ |
|---|---|---|---|---|---|---|---|
| Ex. 32 | $Et_2AlCl$ | 2000 | OTDA | 122 | 2.58 | 1.01 | 378 |
| Ex. 33 | $Et_2AlCl$ | 2000 | BAPMA | 142 | 2.09 | 1.07 | 341 |
| Ex. 34 | $EtAlCl_2$ | 2000 | BAPMA | 142 | 2.23 | 1.07 | 338 |
| Ex. 35 | $Al(BHT)_2Me$ | 8000 | glycerin | 92 | 2.08 | 1.03 | 363 |
| Ex. 36 | DIBAL | 2000 | sorbitol | 182 | 2.29 | 1.04 | 527 |

As demonstrated by the data in Table 4, the combination of various aluminum compounds with TBD results in the effective propoxylation of various low molecular weight hydroxyl-containing and amine-containing starters. As before, polydispersity remains low.

EXAMPLES 37-45 AND COMPARATIVE SAMPLES C-E

In these polymerizations, the starter is the same 700 molecular weight triol describe in earlier examples and the alkylene oxide is propylene oxide. The aluminum compound and phosphorus-nitrogen base are as indicated in Table 5.

In Table 5, "PAZ-P1" indicates t-butylimino-tris(dimethylamino)phosphorane and "HMPA" indicates hexamethylphosphoramide (i.e, tris(dimethylaminophosphine oxide). "DCI16302" and "DCI16303" have the respective structures:

(DCI16302)

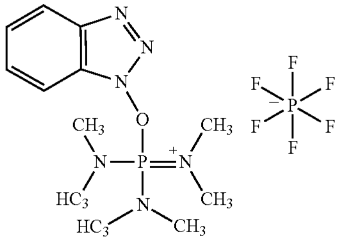

and (DCI16303)

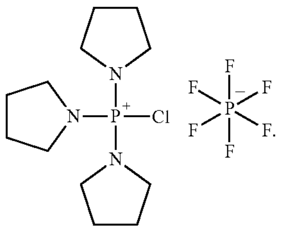

PPNF, PPNOAc and $PPNPF_6$ are, respectively, the fluorine, acetate and $PF_6$ bis(triphenylphosphoranylidene)ammonium salts.

The amount of catalyst in each case is 2000 parts per million based on the starter. The phosphorus-nitrogen base (when present) and the aluminum compound are initially present at a 1:1 molar ratio, which also produces a 1:1 molar ratio of PPNCl to aluminum. The polymerization temperature is 160° C. The amount of product produced, the % of hydroxyl groups that are primary, the number average molecular weight and the polydispersity (PDI, $M_w/M_n$) are as indicated in Table 5.

TABLE 5

| Sample | Al compound | ppm Al compound | Phosphorus-nitrogen base | Yield, g | %1° OH | PDI | $M_n$ |
|---|---|---|---|---|---|---|---|
| Comp. C* | $Et_2AlCl$ | 2000 | None | 1.5 | 7 | 1.08 | 1636 |
| Ex. 37 | $Et_2AlCl$ | 2000 | PAZ-P1 | 2.89 | 5 | 1.03 | 3499 |
| Ex. 38 | $Et_2AlCl$ | 2000 | HMPA | 0.97 | ND | 1.04 | 1213 |
| Comp. D* | $EtAlCl_2$ | 2000 | None | 1.41 | 33 | 1.06 | 1669 |
| Ex. 39 | $EtAlCl_2$ | 2000 | PAZ-P1 | 2.20 | 6 | 1.04 | 2536 |
| Ex. 40 | $EtAlCl_2$ | 2100 | DCI16302 | 1.60 | 11 | 1.05 | 1897 |
| Ex. 41 | $EtAlCl_2$ | 2100 | DCI16303 | 1.41 | 19 | 1.05 | 1681 |
| Comp. E* | DIBAL | 2000 | None | 1.19 | 31 | 1.06 | 1392 |
| Ex. 42 | DIBAL | 2000 | HMPA | 1.43 | ND | 1.05 | 1630 |
| Ex. 43 | TEDA | 1550 | PPNF | 2.90 | 5 | 1.02 | 3693 |
| Ex. 44 | TEDA | 1550 | PPNOAc | 2.87 | 5 | 1.02 | 3487 |
| Ex. 45 | TEDA | 1550 | $PPNPF_6$ | 2.04 | 4 | 1.03 | 2489 |

PAZ-P1 has a strong enhancing effect when used in combination with either the $Et_2AlCl$ or the $EtAlCl_2$ catalyst. HMPA, DCI16302 and DCI16303 all exhibit a mild enhancing effect when used together with the DIBAL catalyst. The fluoride, acetate and hexafluorophosphate bis(triphenylphosphoranylidene(ammonium) salts all exhibit substantial enhancing effects.

What is claimed is:

1. A method for producing an alkylene oxide polymer or copolymer, comprising combining (i) at least one aluminum compound containing at least one trisubstituted aluminum atom, wherein at least one of the substituents of at least one trisubstituted aluminum atom is hydrocarbyl, (ii) at least one starter, (iii) at least one alkylene oxide, (iv) from 0.00005 to 0.1 mole, per equivalent of starter, of at least one phosphorus-nitrogen base, and polymerizing the alkylene oxide(s) or copolymerizing the alkylene oxide(s) and the comonomer to form the alkylene oxide polymer or copolymer, wherein the phosphorus-nitrogen base is (VI)

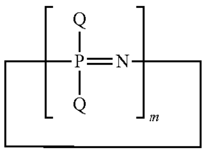

in which m is a number from 3 to 20, each Q is independently selected from hydrocarbyl; —N═P—$R_3$ where each R is independently hydrocarbyl; aryloxy; alkoxy; and

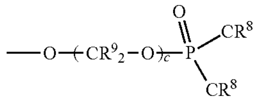

wherein c is zero or a positive number up to 4, each $R^9$ is independently hydrocarbon, and each $R^8$ is independently hydrocarbon.

2. The method of claim 1 wherein an aluminum atom of the aluminum compound is substituted with one or two hydrocarbyl groups, and is substituted with one or two halogen, oxo, ether, hydride or phosphonate groups.

3. The method of claim 1 wherein the aluminum compound includes one or more of trimethyl aluminum, triethyl aluminum, triisopropyl aluminum, tri-n-propyl aluminum, triisobutyl aluminum, tri-n-butyl aluminum, tri-t-butylaluminum and trioctadecylaluminum.

4. The method of claim 1 wherein the aluminum compound includes one or more of dimethyl aluminum chloride, methyl aluminum dichloride, diethyl aluminum chloride, ethyl aluminum dichloride, diisobutyl aluminum chloride, isobutyl aluminum dichloride, methyl aluminum di[(2,6-di-t-butyl-4-methyl)phenoxide] ($Al(BHT)_2Me$), dimethyl 2,6-di-t-butyl-4-methylphenoxide ($AlBHTMe_2$)methyl aluminum di(2,6-diisopropyl) phenoxide, di methyl aluminum (2,6-diisopropyl) phenoxide methyl aluminum di[(2,6-diphenyl) phenoxide], dimethyl aluminum (2,6-diphenyl) phenoxide, methyl aluminum di[(2,4,6-trimethyl)phenoxide], dimethyl aluminum (2,4,6-trimethyl)phenoxide, tetraethylaluminane, tetramethylaluminane, diisobutyl aluminum hydride, isobutyl aluminum dihydride, dimethyl alumimum hydride, methyl aluminum dihydride, diethyl aluminum hydride, ethyl aluminum dihydride, diisopropyl aluminum hydride, isopropyl aluminum dihydride, diethyl aluminum ethoxide, ethyl aluminum diethoxide, dimethyl aluminum ethoxide, methyl aluminum diethoxide, dimethyl aluminum fluoride, methyl aluminum difluoride, diethyl aluminum fluoride, ethyl aluminum difluoride, diisobutyl aluminum fluoride, isobutyl aluminum difluoride, dimethyl aluminum bromide, methyl aluminum dibromide, diethyl aluminum bromide, ethyl aluminum dibromide, diisobutyl aluminum bromide, isobutyl aluminum dibromide, dimethyl aluminum iodide, methyl aluminum diiodide, diethyl aluminum iodide, ethyl aluminum diiodide, diisobutyl aluminum iodide and isobutyl aluminum iodide.

5. The method of claim 1 wherein the aluminum compound includes one or more of bis(dimethylaluminum) methylphosphonate, bis(diethyl aluminum) methylphosphonate, bis(diethoxyaluminum) methylphosponate, bis(di-n-propylaluminum) methyl phosphonate, bis(diisopropyl aluminum) methylphosphonate, bis(di-n-propoxylaluminum) methyl phosphonate, bis(diisopropoxylaluminum) methylphosphonate, bis(di-t-butylaluminum) methyl phosphonate, bis(di-t-butoxyaluminum) methyl phosphonate, bis(diphenylaluminum) methyl phosphonate, bis (diphenoxyaluminum) methyl phosphonate, bis (diisobutylaluminum) methylphosphonate and a tetraalkylaluminoxane in which each alkyl group independently contains 1 to 6 carbon atoms.

6. The method of claim 1 wherein the aluminum compound and starter are combined at proportions that provide 0.00005 to 0.05 moles of aluminum per equivalent of starter.

7. The method of claim 1 wherein a mole ratio of the aluminum compound to the phosphorus-nitrogen base is at least 1:3, and up to 5:1.

8. The method of claim 1 wherein the alkylene oxide is propylene oxide, ethylene oxide or a mixture of propylene oxide and ethylene oxide.

9. The method of claim 1 wherein the starter is a homopolymer of propylene oxide and/or a random or block copolymer of propylene oxide that has a hydroxyl equivalent weight of at least 125 and up to 4000 g/equivalent and in which no more than 25% of the hydroxyl groups are primary.

* * * * *